United States Patent [19]

Schott

[11] Patent Number: 4,608,630
[45] Date of Patent: Aug. 26, 1986

[54] METHOD AND APPARATUS FOR TRANSMITTING DATA WORDS ASYNCHRONOUSLY FROM ONE MICROPROCESSOR TO ANOTHER IN FORM OF TIMING INTERVALS

[75] Inventor: Bernd Schott, Ludwigsburg, Fed. Rep. of Germany

[73] Assignee: Robert Bosch GmbH, Stuttgart, Fed. Rep. of Germany

[21] Appl. No.: 298,943

[22] Filed: Sep. 3, 1981

[30] Foreign Application Priority Data

Sep. 23, 1980 [DE] Fed. Rep. of Germany ....... 3035804

[51] Int. Cl.⁴ .......................... H04J 3/02; H03K 5/26
[52] U.S. Cl. ....................................... 364/200; 375/22
[58] Field of Search ... 364/200 MS File, 900 MS File, 364/130, 131, 132, 133; 375/22-25, 118; 371/5, 32, 22; 370/9

[56] References Cited

U.S. PATENT DOCUMENTS

| | | | |
|---|---|---|---|
| 2,896,160 | 7/1959 | Kronacher | 364/569 |
| 3,674,937 | 7/1972 | Bellanger et al. | 370/9 |
| 3,786,360 | 1/1983 | Kawa | 375/21 |
| 3,979,719 | 9/1976 | Tooley et al. | 371/32 |
| 4,082,942 | 4/1978 | Tada et al. | 364/111 |
| 4,128,892 | 12/1978 | Vasa | 364/569 |
| 4,175,214 | 11/1979 | Wedmore | 370/9 |
| 4,208,724 | 6/1980 | Rattlingourd | 364/900 |
| 4,225,960 | 9/1980 | Masters | 371/5 |
| 4,257,108 | 3/1981 | Igel | 375/22 |
| 4,327,441 | 4/1982 | Bradshaw | 375/22 |
| 4,345,325 | 8/1982 | Gandini et al. | 375/25 |
| 4,347,617 | 8/1982 | Murano et al. | 375/22 |
| 4,375,078 | 2/1983 | Thoma | 364/200 |
| 4,377,843 | 3/1983 | Garringer et al. | 364/200 |

*Primary Examiner*—Thomas M. Heckler
*Assistant Examiner*—Daniel K. Dorsey
*Attorney, Agent, or Firm*—Frishauf, Holtz, Goodman & Woodward

[57] ABSTRACT

Data is transmitted asynchronously between a master and a slave microprocessor unit by first converting the number representing the word or part thereof to be transmitted into a time interval, transmitting a pulse having a width corresponding to the time interval and, at the receiver, reconverting the pulse width (time interval) to a number. Conversion and reconversion can be accomplished by, respectively, down counting a counter with a fixed frequency from the number constituting the word to be transmitted and up-counting a counter during the received pulse width at the same frequency.

13 Claims, 3 Drawing Figures

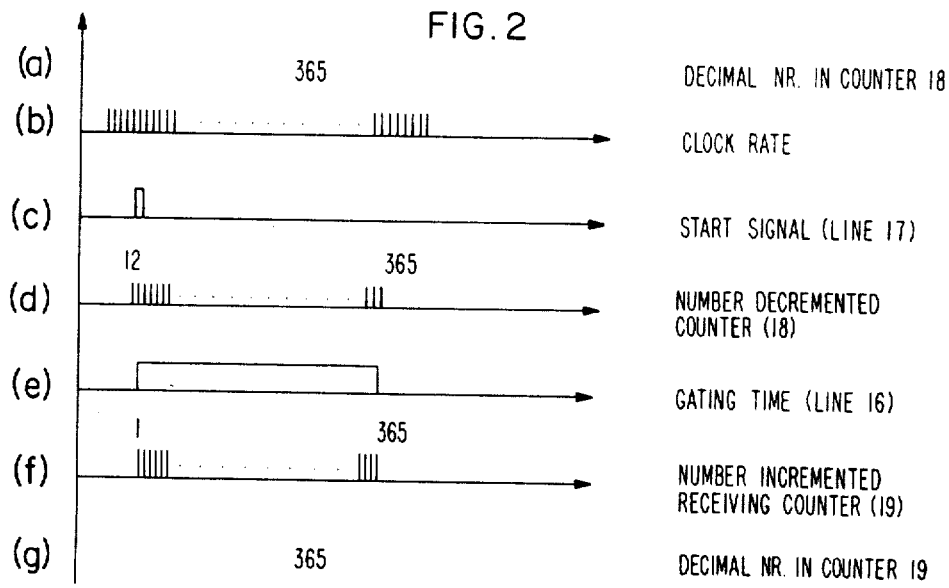
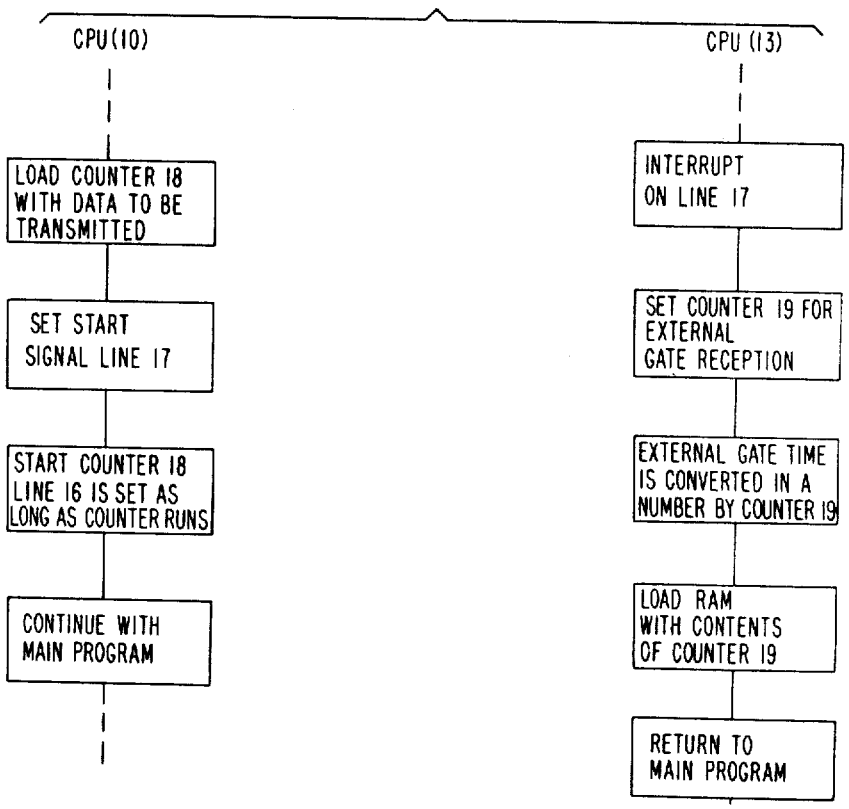

METHOD AND APPARATUS FOR TRANSMITTING DATA WORDS ASYNCHRONOUSLY FROM ONE MICROPROCESSOR TO ANOTHER IN FORM OF TIMING INTERVALS

Cross-Reference to Related Applications and Publications: "Electronik", 1979, No. 26, pages 33 to 38.

The present system relates to data transmission between at least two microprocessing systems, each of the systems having a central processing unit, an input/output unit and a storage unit.

BACKGROUND OF THE INVENTION

In the magazine "Electronik", 1979, No. 26, pages 33 to 38, a system is described in which a master microprocessor transmits information to and receives information from a multiplicity of other microprocessor systems. It is an object of such a system to decrease the data handling requirements of the microprocessor by carrying out sub-programs, etc. in so-called "slave" microprocessor systems associated therewith. In such systems, data transmission takes place either in parallel over a joint bus system or serially by addition of components for converting the data words from a parallel to a serial form. If it is impossible to effect either serial or parallel transmission between the two systems, then data transmission cannot take place between them at all.

THE INVENTION

It is an object of the present invention to allow data transmission between or among microprocessing systems even without interfaces for transmitting or receiving words in either parallel or serial form.

It is a further object of the present invention to allow data transmission from one unit to the other without using too much of the available computing time of the system.

Further, the apparatus of the present invention is to be relatively independent of interrupts and little, if any, additional components are to be required for its implementation.

In accordance with the present invention, the microprocessor system from which the data is to be transmitted converts the word represented by a number or portion of the word to be transmitted into a gating time interval. A signal having a duration of said time interval is transmitted to the receiving system, where it is reconverted into a number which, then, reconstitutes the word, or word portion. Preferably, the time converters and reconverters are counters which are already present in the system, for example either in the central processing unit or in the input/output unit. Data transmission according to the present invention can thus be implemented using only components already present in the system.

BRIEF DESCRIPTION OF THE DRAWING

FIG. 2, in graphs a through g, shows conversion of a digital number into a representative timing interval, and reconversion thereof into the digital number, selecting, as number, the number 365, for example representing the number of days in a year; and FIG. 3 is a flow diagram illustrating the conversion of a number to a timing interval, and reconversion thereof to the original number, and explaining the operation of the system of FIG. 1.

DESCRIPTION OF THE PREFERRED EMBODIMENT

Figure 1:
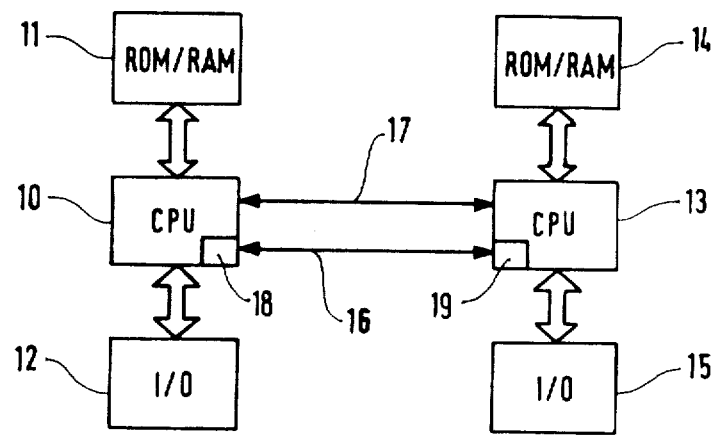
FIG. 1 illustrates the connection between two microprocessor systems in block diagram form.

The first (master) microprocessor system consists of a central processing unit (CPU) 10 connected to a storage unit (ROM/RAM) 11 and an input/output unit (I/O) 12. A second similarly constructed microprocessor system consists of corresponding units 13, 14 and 15. Central processing units (CPUs) 10 and 13, each, include a counter 18, 19 whose counting inputs and outputs are connected to each other by a transmission line 16. Further, central processing units 10 and 13 are connected to each other by a control line 17. Control line 17 is either connected to the interrupt inputs of the CPUs 10, 13 or to the flag inputs/outputs. Which of the inputs are utilized depends on the particular microprocessor system. Microprocessor CDP 1804 (RCA) has a counter which can be utilized as counter 18 or 19. When this microprocessor is used, of central processing unit 10 transmission line 16 is connected from output logic circuits associated with counter 18 to input logic circuits associated with counter 19.

Central processing unit 10 of the master system operates under control of a main program, while central processing unit 13 utilizes sub-programs which need the command of the master system in order to run. The necessary commands as well as the required data are transmitted in the form of data words.

Central processing unit 13 receives a signal through control line 17 which indicates that information is now to be transmitted to it. The acknowledgment that data is being received is transmitted over the same line.

In accordance with the invention, data words to be transmitted represented in form of a number are converted by counter 18 to a gating time interval. This is done by setting counter 18 to the number to be transmitted, which represents the data word, and then counting down at a fixed clock frequency. This is, of course, by no means the only way by which this conversion can be accomplished. During the counting process, a signal is present on transmission line 16 whose duration corresponds to the duration of the counting process and thus to the number to be transmitted. Counter 19 converts the received time interval back to a number. This can be done by counting up in counter 19 during the time that a signal is carried on line 16 at the same frequency as the clock frequency used to convert the number representing the data word into a timing interval. The end count on counter 19 is then identical to the number originally transmitted from the first system.

Transmission, of course, can also take place in the other direction, from microprocessor unit 13 to microprocessor unit 10. In this way, the master microprocessing system can call up information from the slave system.

The system of the present invention can be used for transmission among a multiplicity of microprocessor systems. In that case, either a plurality of control lines must be provided or different codes are transmitted over the same line, each code identifying the system addressed.

If the clock frequency available for counters 18 and 19 is relatively low, and there is no time available in the particular part of the program at which transmission is to be carried out, then the required transmission time can be decreased by splitting the data word to be transmitted. The number of partial transmissions, i.e. transmissions for parts of one word, should be optimized for each application. It depends on the particular microprocessor system, the length of the word, and the application. The apparatus is very flexible in that the words can be split into a number of data units or parts, which split number is entirely arbitrary.

The transmission of data, instead of being between central processing units can also take place from input/output unit 12 to input/output unit 15. Of course, counters must then be present in the input/output units. The transmission process is the same as that described above.

Additionally, instead of two lines 16 and 17, a single line may be used both for control and data transmission. Such a single line must then of course be connected to the counters as well as to the interrupt or flag inputs of the CPUs 10, 13.

FIG. 2 is a timing diagram illustrating the various signals which occur in the system. Graph a merely lists a decimal number—selected, for example, as the number of the days in the year—which is entered in counter 18. Of course, the decimal number can be converted, first, to a binary number in a well known decimal-binary converter. A clock, providing clock pulses and part of the CPU 10 runs, providing pulses as shown in graph b. If the number 365 is to be transmitted, the counter 18 is set to number 365 and, upon application of a start signal, which likewise is transmitted over line 17, the counter will count 365 pulses—see graph d—providing one long output signal as shown on graph e as long as it takes for the counter to count down the number 365. The counter—see graph b—will continue to count, but the gating time interval, transmitted on line 16, has terminated.

Simultaneously, upon receipt of the start signal line 17, the CPU 13 at the receiver has received a signal which started the counter 19 therein to start counting the pulses applied as a clock signal, and, at the same rate, during the time that the gating line 16 is open, that is, during the same period of time shown by the graph e of FIG. 2. Consequently, the counter 19 will receive 365 pulses, which number will be in the counter and can be retrieved therefrom in decimal or binary form, see lines g.

FIG. 3 illustrates the flow diagram to carry out the foregoing. In the first step, the counter 18 is loaded with the data to be transmitted, that is, for example, programmed to accept, upon receipt of a start signal, only 365 pulses. FIG. 3 omits the generation of the clock signals, which, of course, are inherent in all computer apparatus. Thus, upon generation of the start signal, that is, the "set start signal line 17" block, the counter 18 will start counting and, simultaneously, line 16 will provide a single pulse which will persist for the duration of the count of the counter—in the example for the decimal number of 365 pulses. As soon as the 365th pulse is ended, the line 16 is disabled, and the counter can then return to other functions. When the counter has been started, the CPU 10 can continue with other programs.

In the receiving CPU 13, the similar sequence will have occurred. Again, the clock pulses are not shown. Upon receiving the interrupt or start pulse on line 17, the counter will be enabled and will count for the duration of the pulse shown in FIG. 2 on graph e and, then, necessarily will reach the count number 365. The counter 19, thus, during an open "gate" thereto, will reconvert the time interval into the number, see third block, right portion of FIG. 3. The output of the counter, in accordance with well-known computer usage, can be loaded in a random-access memory (RAM), so that the transmitted information can be accessed, as desired, and the counter returned to other functions. The counter can then return to other functions in the main program.

Many variations of the inventive concept are possible. For example, the time interval could be indicated by a start and a stop signal rather than a pulse having a duration corresponding to the word. The interval itself could be created by a variable delay rather than a count. Many other variations will be readily apparent to one skilled in the art and are intended to be encompassed in the following claims.

I claim:

1. Apparatus for transmitting data from a first microprocessor system (10, 11, 12) to a second microprocessor system (13, 14, 15), in which the data are in form of data units represented by numbers, comprising means (18), in said first system (10, 11, 12) for receiving and converting a number representing a data unit to be transmitted to a corresponding gating time interval and generating a signal having a time duration, with respect to a predetermined time base, corresponding to said gating time interval, whereby said gating time interval, and hence said time duration, will be representative of the number to be transmitted;

means (16) for transmitting to said second microprocessor system said signal having said time duration and defining said gating time interval;

means (19) in said second microprocessor system (13, 14, 15) connected to receive said signal having said time duration, for determining said time interval, with respect to said time base, and for reconverting said signal back to the number constituting said data unit; and a control line (17) interconnected between said first and second microprocessor system for signalling said data transmission.

2. Apparatus as set forth in claim 1, wherein said converting means comprises a counter (18).

3. Apparatus as set forth in claim 1, wherein said first microprocessor system comprises a central processing unit (10), an input/output unit (12) and a storage unit (11);

wherein said second microprocessor system comprises a central processing unit (13), an input/output unit (15), and a storage unit (14);

and wherein said converting means comprises a counter (18) in said central processing unit of said first microprocessor system and said reconverting means comprises a counter (19) in said central processing unit of the second microprocessor system.

4. Apparatus as set forth in claim 1, wherein said first and second microprocessor system each comprises a central processing unit, and input/output unit and a storage unit;

and wherein said converting means and said reconverting means comprises means for counting elapsed time, at the same counting rate, operative in the input/output unit of said first and second microprocessor system, respectively.

5. Apparatus as set forth in claim 1, wherein each of said central processing units has interrupt inputs and flag inputs/outputs; and wherein said control line is connected between said interrupt or flag inputs/outputs.

6. Apparatus as set forth in claim 5, wherein said signal signifying said gating time interval is transmitted over said control line also.

7. Apparatus as set forth in claim 1,
wherein said first and second microprocessor system process data in words;
and wherein said data units comprise parts of each of said words.

8. Apparatus as set forth in claim 3, wherein said counter (18) in said central processing unit of said first microprocessor system and said counter (19) in said central processing unit of the second microprocessor system count at the same counting or clock frequency.

9. Apparatus as set forth in claim 4, wherein said means for counting constituting said converting means and said means for counting constituting said reconverting means operate at the same counting or clock frequency.

10. Method of transmitting data in the form of data units which are represented by numbers, from a first microprocessor system (10, 11, 12) to a second microprocessor system (13, 14, 15), comprising the steps of
generating a clock signal at a predetermined frequency to establish a time base;
converting the number representing a data unit to a representative time interval with respect to the time base, and generating a signal having a time duration corresponding to said representative time interval, whereby said timing interval, and hence said time duration, will, with respect to said time base, be representative of the number to be transmitted;
transmitting said signal having said time duration from the first to the second microprocessor system;
and reconverting, with respect to said time base, said transmitted signal having said time duration into said number to thereby determine said data unit, said step of converting the number and the step of reconverting the number being both carried out with respect to said same time base.

11. Method according to claim 10, wherein
said step of converting the number representing the data unit to a timing interval comprises counting-out, in a counter, the number with respect to the clock signal at the predetermined frequency;
and the step of reconverting said signal comprises applying said signal to a counter and operating the counter during said timing interval at said predetermined frequency to reconstitute the number representing the data unit originally converted in said representative timing interval.

12. Apparatus for transmitting data in form of data units which are represented by numbers from a first microprocessor (10, 11, 12) to a second microprocessor system (13, 14, 15), comprising
number-to-time conversion means (10) in said first system for converting a number representing a data unit to be transmitted to a corresponding representative gating time interval, and generating a signal having a time duration corresponding to said gating time interval representative of the number, said conversion means (10) in said first system including a first counter means (18) having said number applied thereto, said first counter means counting at a predetermined clock frequency so that the time of counting at said clock frequency will be representative of the number and define the gating time interval;
transmission means (16) for transmitting to said second microprocessor system (13, 14, 15) said signal having said time duration corresponding to said gating time interval, and hence to said number; and
time-to-number conversion means (13) in said second microprocessor system for receiving said signal having said time duration, and reconverting said signal back to the number constituting said data unit, said reconversion means (13) in said second system including a second counter means (19) having said signal persisting for said time interval applied thereto to count during the time interval at said predetermined clock frequency so that, during the time of counting at said predetermined clock frequency, the counter will generate an output representing said number,
whereby the counting time of the first counter means for counting determines the time duration of said signal, and thus said gating time interval representing said number with reference to a time base determined by said predetermined clock frequency, and the second counter means for counting reconverts the time interval represented by the time duration of said signal, with respect to the same time base, and thereby into said number, thus reconstituting said data unit.

13. Method according to claim 10, wherein
said step of converting the number representing the data unit to a timing interval comprises counting-out the number with respect to the clock signal at the predetermined frequency;
and the step of reconverting said signal comprises analyzing said signal during said timing interval with respect to a clock signal of said predetermined frequency to obtain, by reconstitution with respect to said predetermined clock or counting frequency, the number representing the data unit originally converted into said representative timing interval.

* * * * *